US006972761B1

(12) United States Patent
Cox et al.

(10) Patent No.: US 6,972,761 B1
(45) Date of Patent: Dec. 6, 2005

(54) METHOD AND APPARATUS FOR MONITORING WORK CENTER OPERATIONS

(75) Inventors: Kenneth Charles Cox, Naperville, IL (US); Lichan Hong, Mountain View, CA (US); Vladimir Nepustil, Boulder, CO (US); Paul L. Richman, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 515 days.

(21) Appl. No.: 09/634,158

(22) Filed: Aug. 9, 2000

(51) Int. Cl.[7] .............................................. G06T 11/20

(52) U.S. Cl. ........................ 345/440; 715/734; 715/736

(58) Field of Search .............................. 345/440, 440.1, 345/440.2, 441, 442, 35, 208; 715/716, 733, 715/734, 735, 736, 737, 744; 704/202

(56) References Cited

U.S. PATENT DOCUMENTS

| | | | | |
|---|---|---|---|---|
| 4,800,510 A | * | 1/1989 | Vinberg et al. | 364/521 |
| 5,167,010 A | * | 11/1992 | Elm et al. | 706/45 |
| 5,510,809 A | * | 4/1996 | Sakai et al. | 345/140 |
| 5,890,130 A | * | 3/1999 | Cox et al. | 705/400 |
| 5,999,193 A | * | 12/1999 | Conley, Jr. et al. | 345/440 |
| 6,222,540 B1 | | 4/2001 | Sacerdoti | 345/339 |
| 6,407,751 B1 | | 6/2002 | Minami et al. | 345/736 |
| 2002/0046072 A1 | | 4/2002 | Arai et al. | 705/8 |

OTHER PUBLICATIONS

U.S. Appl. No. 09/516,088, filed 030100, Cox et al.

* cited by examiner

Primary Examiner—Dennis-Doon Chow
(74) Attorney, Agent, or Firm—Sheridan Ross P.C.

(57) ABSTRACT

A work center monitoring system includes an output device, such as a cathode ray tube (CRT), liquid crystal display (LCD), or other display device and a display controller. The controller formats work center information to be displayed on the output device as single-valued and multi-valued display segments. Each segment displays information related to work center activities, which may be categorized as various skills. The displays may be provided to a work center supervisor to assist in the management of a work center, such as a contact and fulfillment center. Current and historical values of the parameters may be displayed, simultaneously, or in sequence. The values of the displayed parameters may be different types, such as any of a variety of numerical representations which might represent the number of calls in one or more queues, or the oldest call in a queue, for example. The values may be indicative of the elapsed time for servicing the oldest call in a queue, or other indications of time. The information being displayed may derive from a number of sources such as a work center management database, directly from a call management system, or from some other source. In accordance with the principles of the invention, the displayed parameter representations include indicia of "permissible" parameter values. One such indicator might be an "I-beam" glyph that indicates the highest and lowest acceptable values for a particular parameter. The area immediately surrounding such an "I-beam" glyph may include further indicia, such as graduated zones of acceptability.

30 Claims, 5 Drawing Sheets

FIGUR3

METHOD AND APPARATUS FOR MONITORING WORK CENTER OPERATIONS

FIELD OF THE INVENTION

The invention relates to display systems and, more particularly, to interactive displays for the presentation and analysis of activity within a work center.

BACKGROUND OF THE INVENTION

Workflow analysis is often employed to assist in the management of work center operations. In a call distribution center, for example, data related to the number and duration of calls an agent handles is typically collected and analyzed. A supervisor may query a database in order to further analyze this workflow information and to adjust workloads among a group of agents. One or more agents within the call center may be particularly efficient, or may be working on a type of call that typically requires less effort and, consequently, may be able to handle more calls, while other, possibly less efficient agents, are unable to handle their assigned workload. This disparity may not be apparent to the manager who determines the number and type of calls to be directed to individual agents within the call center. Upon querying a workflow database a supervisor may be able to determine these variations in workflow demand and, consequently, may be able to adjust work assignments to improve the overall efficiency of the call center. However, analysis of a printout or textual display of workflow statistics may require a certain level of sophistication on the part of the supervisor. And, even assuming that the supervisor possesses this analytical sophistication, the analysis of the workflow information may be so time-consuming as to prohibit real-time adjustment of workflow.

Although daily or weekly analysis of workflow information may be a valuable management tool, more frequent analysis may provide for increased efficiencies. However, current presentation methods may impede a manager's absorption of work center activity related information. That is, lists or spreadsheets filled with the numerical, textual, representations of workflow data may not be readily comprehensible. Without effective representation of work center activity, efficiencies and significant business opportunities may be lost.

An apparatus and method that provide readily comprehensible representations of work center activity to a supervisor would therefore be highly desirable, and one which affords a temporal view of work center operations would be particularly useful.

SUMMARY

A work center monitoring system in accordance with the principles of the present invention provides readily comprehensible information regarding work center activities to a display such as a display that may support a work center supervisor. A work center display system in accordance with the principles of the present invention includes an output device, such as a cathode ray tube (CRT), liquid crystal display (LCD), or other display device and a display controller. The display controller and display device operate in concert to display images that are representative of work center activities.

The displayed images depict values of parameters related to the skills, which a supervisor is managing in the work center. Current and historical values of the parameters may be displayed, simultaneously, or in sequence. The values of the displayed parameters may be different types, such as any of a variety of numerical representations which might represent the number of calls in one or more queues, or the oldest call in a queue, for example. The values may be indicative of the elapsed time for servicing the oldest call in a queue, or other indications of time. The information being displayed may derive from a number of sources such as a work center management database, directly from a call management system, or from other sources. In accordance with the principles of the present invention, the displayed parameter representations may include indicia of "allowable", or preferred, parameter values. One such indicator may be an "I-beam" glyph, that is, a glyph having the shape of a cross section of an I-beam with a vertical line connecting two horizontal lines. The horizontal sections of the glyph may be used to indicate the highest and lowest acceptable values for a particular parameter. The glyph may be overlaid, for example, on a bar chart that displays current values of a parameter of interest. The area immediately surrounding such an "I-beam" glyph may include further indicia, such as graduated zones of acceptability. That is, for example, as parameter values approach a limit, a color code may be employed, such as a yellow zone, to advise caution. As the parameter value approaches the limit even more closely, the area immediately surrounding the I-beam glyph may turn red, or the entire glyph, the surrounding bar chart, or portions thereof, may flash in order to alert a work center supervisor to the impending boundary violation.

Although the provision of readily comprehensible work center information in accordance with the principles of the present invention is not restricted to any one type of work center, the methods and apparatus are particularly suited to application in a "contact and fulfillment center", for example, in which customer inquiries are routed to customer service stations within the center. Such customer inquiries may be in the form of telephone calls received at a call processing center, Internet inquiries received at a website, or other such work center where a plurality of service representatives respond to inquiries received via a telecommunications device. For ease of illustration and clarity of presentation, the illustrative embodiments of the invention will involve contact and fulfillment centers, but, the invention's apparatus and method may find application in any work center activity display system.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A work center monitoring system in accordance with the principles of the present invention provides readily comprehensible information regarding work center activities to a display, such as a display that may support a work center supervisor. The system includes an output device, such as a cathode ray tube (CRT), liquid crystal display (LCD), or other display device, and a display controller. The display controller and display device operate in concert to display images that are representative of work center activities. The displayed images depict values of parameters related to the skills that a supervisor is managing in the work center. In accordance with the principles of the invention, the displayed parameter representations may include indicia of "permissible" parameter values. One such indicator might be an "I-beam" glyph that indicates the highest and lowest acceptable values for a particular parameter. The display may employ size, color, number and other display characteristics, such as patterns, flashing, or other such visual cues to convey information about work parameters of interest in a work center.

Figure 1:
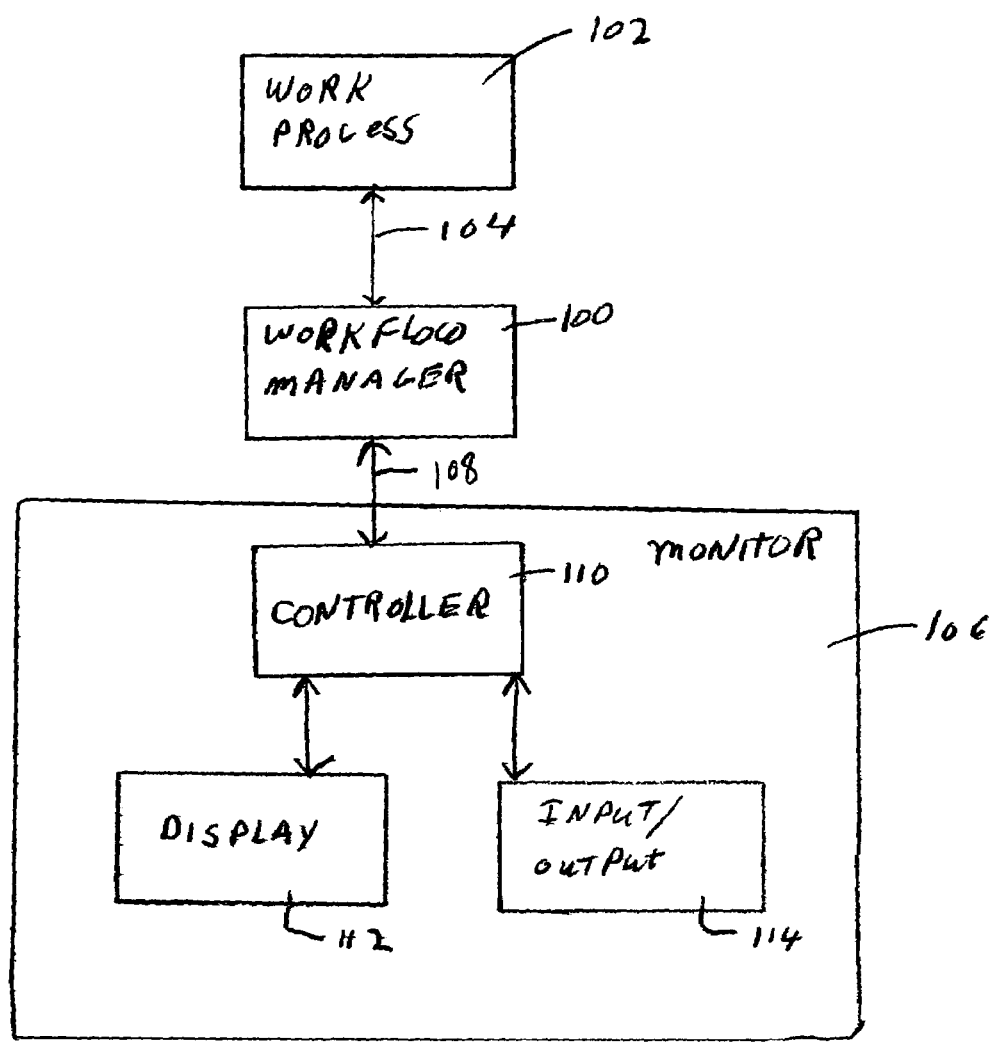
FIG. 1 is a conceptual block diagram of a system that includes a work center monitoring system in accordance with the principles of the present invention.

A work center monitoring system such as that illustrated in the conceptual block diagram of FIG. 1 includes a management system, or manager, 100 that communicates with a work process 102. The manager 100 is an automated system that may include a general-purpose computer and/or a combination of hardware and software developed specifically for the work process 102. The work process 102 may take any one of many forms, such as the distribution of calls in a call distribution system, for example. For the sake of brevity and clarity of explanation, the invention will be discussed hereinafter in the context of a call-distribution application. However, the provision of readily comprehensible work center monitoring representations in accordance with the principles of the present invention are not restricted to any one type of work center.

Communications between the work process 102 and work manager 100 take place over a communications link 104. The communications link 104 may take the form of a high-speed local area network (LAN) connection, a standard computer bus interface, or other communications means. Management information exchanged between the manager 100 and the work process 102 may include information sent from the work process 102, such as the number of telephone calls waiting in a particular queue, whether individual agents are currently occupied, which call has been waiting in which queue for how long, and so on. Information sent from the manager 100 to the work process 102 may include control signals that switch telephone calls from one, overloaded, incoming queue to another queue, for example. In a contact and fulfillment application, incoming messages may arrive at the work process element 102 in the form of telephone calls, as input to an Internet website, as facsimile, video, or other form of telecommunication. The type of data might include time, date, number of agents, agent identifier number, character strings, or other types of data.

The manager 100 also communicates with a monitoring system 106 through a communications link 108, which, like the link 104, may take the form of a LAN connection, a standard interface bus, or other communications means. The monitoring system 106 includes a controller 110 which, in this illustrative embodiment, communicates with the manager 100 through the link 108.

Figure 2:
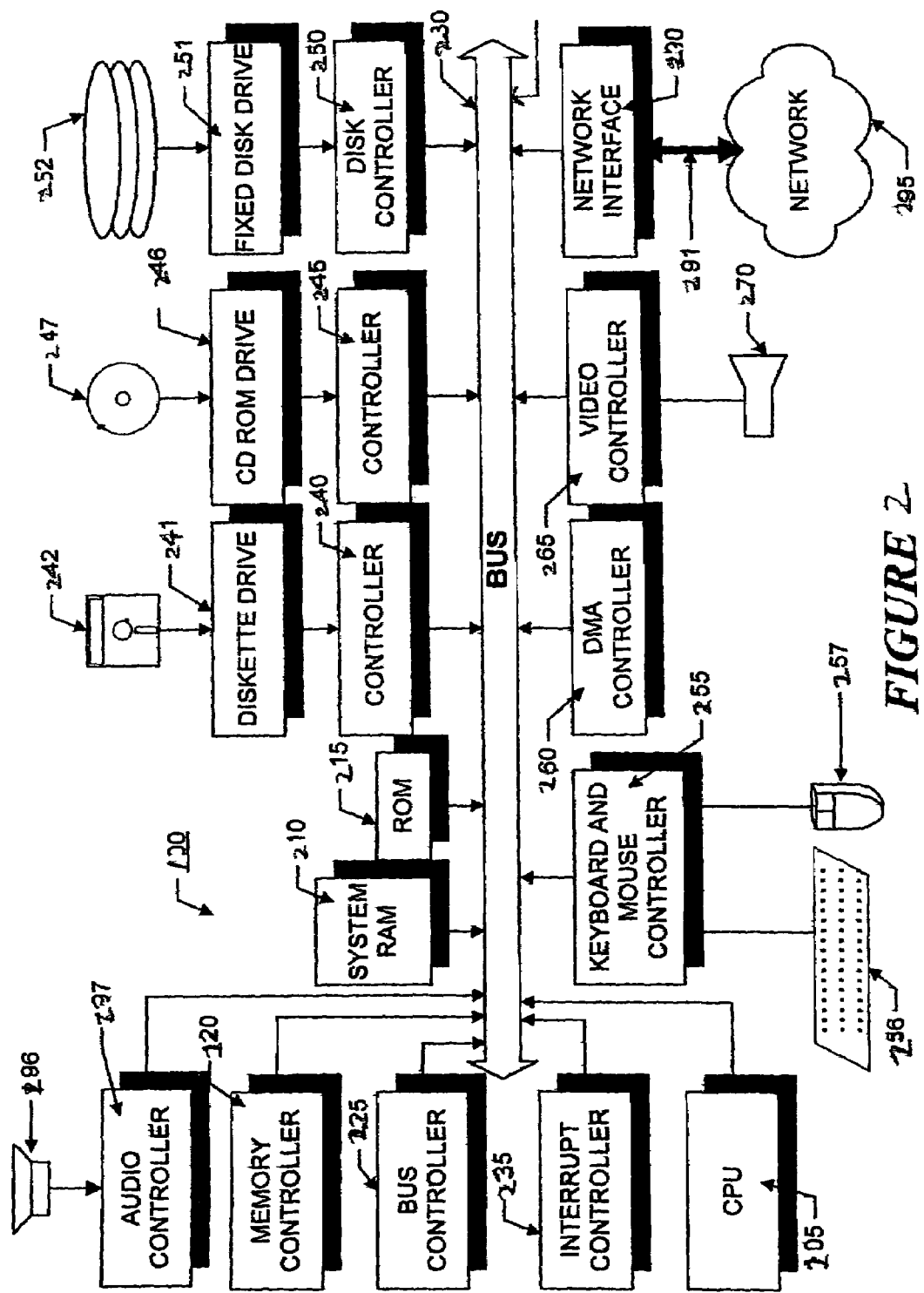
FIG. 2 is a conceptual block diagram of a computer system that may be used to display work center monitoring information in accordance with the principles of the present invention.

FIG. 2 illustrates the system architecture for a computer system 200 on which the invention may be implemented. The exemplary computer system of FIG. 2 is for descriptive purposes only. Although the description may refer to terms commonly used in describing particular computer systems, the description and concepts equally apply to other systems, including systems having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adaptor 290 which allows the system to be interconnected to a local area network (LAN) or a wide area network (WAN), schematically illustrated by bus 291 and network 295. An input interface 299 operates in conjunction with an input device 293 to permit a user to send information, whether command and control, data, or other types of information, to the system 200. The input device and interface may be any of a number of common interface devices, such as a joystick, a touch-pad, a touch-screen, a speech-recognition device, or other known input device.

Operation of computer system 200 is generally controlled and coordinated by operating system software. The operating system controls allocation of system resources and performs tasks such as processing scheduling, memory management, networking, and 110 services, among things. In particular, an operating system resident in system memory and running on CPU 205 coordinates the operation of the other elements of computer system 200. The present invention may be implemented with any number of operating systems, including commercially available operating systems. One or more applications, such may also run on the CPU 205. If the operating system is a true multitasking operating system, multiple applications may execute simultaneously.

Figure 3:
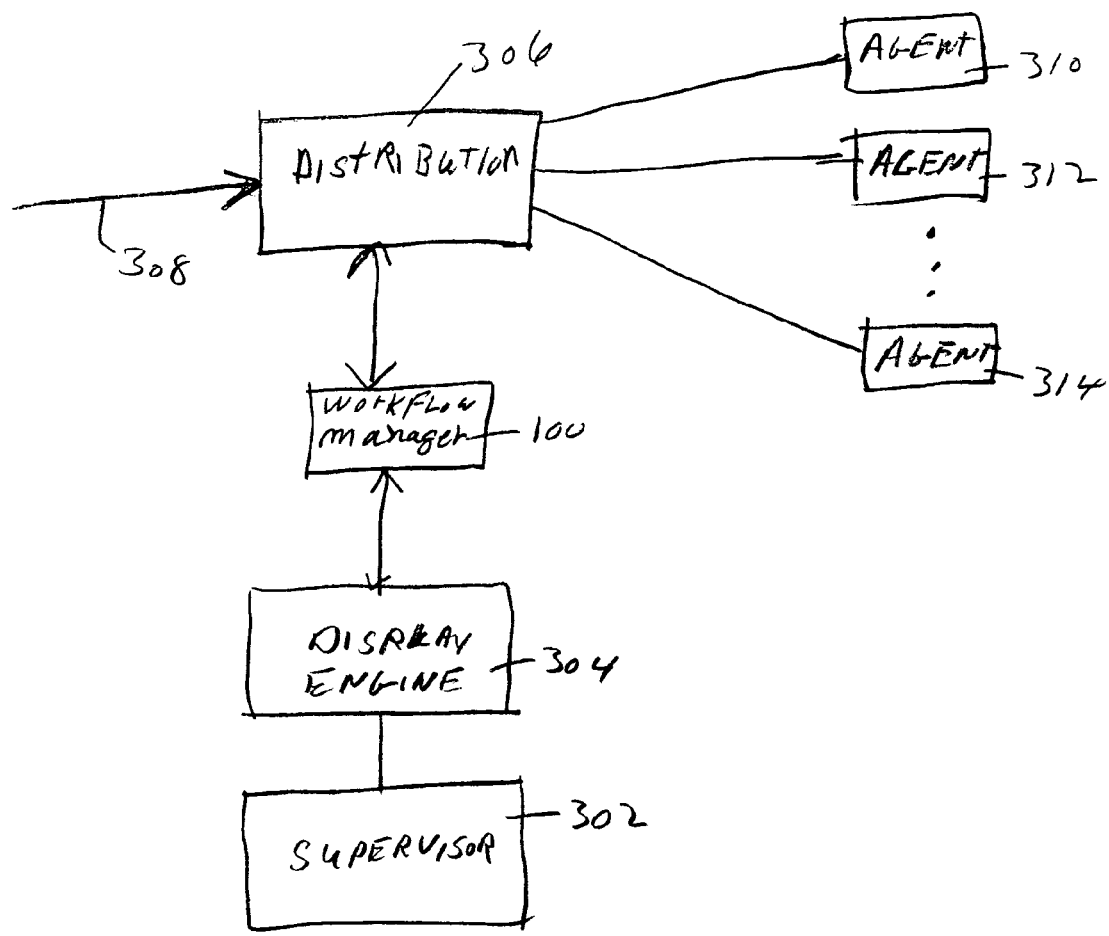
FIG. 3 is a conceptual block diagram of work center monitoring system in accordance with the principles of the present invention.

FIG. 3 illustrates conceptually the main components of a contact and fulfillment system in accordance with the present invention. A supervisor interface 302 may include a known user input device and device interface, such as keyboard and mouse (with corresponding controllers), a joystick, touch pad, touch screen, voice-input device, etc. The new interactive display engine 304 may include various of the hardware components described in the discussion related to FIG. 2, including a display 112 and controller 110. The display engine accepts input from the supervisor input 302 and from the manager 100. In response to input from either the user input 302 or manager 100, the controller 110 produces output for the display 112. In this illustrative embodiment, the work center employs a distributor 306 to route incoming requests from potential customers via a customer-input path 308. As previously discussed, these requests may take any of a number of forms, such as telephone calls or input to an Internet site. The distributor automatically routes these requests to agents 310, 312, 314. As will be discussed in greater detail below, the software elements of the system may be implemented using object-oriented programming techniques.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B.

Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related.

Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs. In accordance with the principles of the present invention, OOP, or other programming techniques may be employed to implement the representation functions discussed below.

In accordance with the principles of the present invention, the display 112 may be employed to display information related to various work center operations. In the illustrative embodiment of FIG. 4 the display 112 provides a view of call flow in a call distribution center. In the illustrative embodiment of FIG. 4, a display 400 includes a monitor 402, a monitor 404, and a key 406 for interpreting various attributes, such as color or shading, for example, of the monitors. In this illustrative embodiment, call center database and customer database information are displayed to support a contact and fulfillment center's supervisory task. A contact and fulfillment center typically provides a variety of services in addition to those of a conventional call management center and involves a broad spectrum of skills, the application of which a supervisor must manage. A display such as that of FIG. 4 supports such a management task, for example, by allowing a supervisor to compare the application of a multiple skills. The application of these skills may be illustrated by means such as a bar graph 408 or 410, line graph 412 or 414, or other means. As indicated by dotted lines 416 that would not actually be displayed, in this illustrative embodiment, each monitor 402 and 404, includes an associated bar graph 408 and 410 and line graph 412 and 414, respectively. Each monitor may include a label that reflects the skill being illustrated, as with the label 418 which indicates that catalog sales skills are being displayed, or with the label 420 which indicates that psychic hotline skills are being displayed. Affordances 422 and 424 respectively situated next to the sales 418 and agents 420 skill names allow a supervisor to select from a pull-down list of such skills for display.

In the illustrative embodiment, each monitor 402 and 404 includes a bar chart 412 and 414, respectively, which display the current values of the monitored parameters. Each monitor 402 and 404 also includes respective line charts 408 and 410, that display the historical behavior of the monitored parameters. The scale of each line chart may be modified to, for example, lengthen or shorten the review period and the monitored parameters may be chosen by the supervisor or they may be predetermined as a package set specific to a particular view. The parameter values may be obtained, for example, through a specified database path and SQL (structured query language) query established by the display designer.

In this illustrative embodiment each bar of the bar charts 412 and 414 correlates with one of the monitored parameters. Additionally, the displayed parameters may be heterogeneous in type and, consequently, the scaling employed to size each of the bars may be independent from that employed for every other bar. Conventional techniques, such as scaling to the range of the minimum and maximum values encountered to date, may be employed to dynamically choose the scaling for each bar. Additionally, to visually link the bar chart with an associated line chart and/or other monitors, each bar may be assigned a unique color. Various color intensities, including "pastel" and "vivid" may be employed. In addition to the illustrated bar chart, other display means, such as one that emulates a dial gauge, such as a tachometer, for example, may be employed to illustrate individual skill values.

Each bar within a bar chart such as bar chart 412 may include a visual cue, such as the illustrated "I-beam" shaped glyphs 426 and 428 that provide a visual indication of a range of values, such as a preferred, or "allowed", range of values for the corresponding parameter. Other methods of displaying such ranges of values, including the display of discontinuous ranges (ranges, for example, less than 5 or between 15 and 30) may be employed. The range of interest, an "allowed" range for example, may be set by the display's end-user, such as a supervisor, by a programmer or system integrator that builds the report from which data is displayed, or they may be extracted from a call management system or customer database from which the report is derived. Additionally, the display may employ a graphical user interface to allow a user to adjust these ranges. That is, for example, the graphical user interface may allow a user to adjust the top and bottom horizontal lines of the I-beams glyphs with a mouse to thereby adjust the range of allowable values for a given parameter.

An indication of whether the current value of a parameter falls within an preferred range or not may be provided, for example, by the locations of the extremities of a bar relative to the extremities of the I-beams glyphs. That is, if the top of a bar extends above the top cross piece of an I-beam glyph or bellow the bottom cross-piece of an I-beam glyph, the current value of the parameter lies outside the preferred range. Additionally, color or other attributes of the bar may be employed to alert a user to the fact that a current parameter value falls outside a preferred range. For example, when a current parameter value exceeds the highest or lags the lowest permissible value, the bar color may be switched from a low-key pastel, to an intense, saturated value of the same color. Other visual cues, such as flashing, or specific alarm colors, may be employed in addition to or as a substitute for such color-mapping "alarms".

In another aspect of the invention, the display may be employed as an inter-active component of a contact and fulfillment system by generating an event that is propagated to the remainder of the system. Providing this capability to the display permits the distribution of monitoring and alerting functions to supervisory desktops and allows supervisors to set parameters that may effect the entire system. For example, should a supervisor alter the permissible range of calls in queue for the sales function by altering the I-beam glyph, that change could be reflected in the adjustment of routing algorithms for the system or activating "alert lights" on the walls of a contact and fulfillment center.

A supervisor may modify acceptable parameter ranges, for example, by selecting an I-beam glyph and moving the glyph "up" or "down" on the display in order to change the preferred range correspondingly. A supervisor may also modify one of the limits by selecting one of an I-beam glyph's horizontal cross-pieces and moving it up or down to raise or lower the respective range limit. Additionally, to provide more precise control of the range limits, a popup dialog box may be activated, for example, by "clicking on" an I-beam glyph or related bar graph. The dialog box thus activated may include "low" and "high" range value locations, in which the supervisor may type specific numerical values respectively corresponding to the lower and upper limits of the preferred range for the displayed parameter. Once the values are entered by the supervisor, the I-beam glyph reflects the updated values by lowering or raising one or both of its horizontal cross-members.

Line charts such as line charts 408 and 410 are particularly suited to the temporal analysis of center behavior and to the recognition of trends in the center's operation. The reports illustrated by line charts reflect data updated at intervals that may be specified by a user. In this illustrative embodiment, whenever a report is updated the latest parameter values are reflected in the bar charts 412 and 414 and, at the same time, the line charts 408 and 410 "scroll" to illustrate the updated parameter values. Additionally, in this embodiment, the same color code employed for the bar chart is used in the corresponding line chart.

Dialog boxes 430, distributed across the top of the display 400 in this illustrative embodiment, afford a primary control interface for a supervisor. That is, each of the dialog boxes may provide access to the control of various display features. For example, a supervisor may activate a dialog box, by "clicking on" the box, to select which of several report types to display. The report types may include reports related to specific agents active within the work center, to specific skills involved in the various work center operations, or to other types of supervisory information. Another of the dialog boxes 430 may permit a supervisor to reconfigure alarm indicators, changing an alarm indicator from yellow to red, from a steady display to a flashing display, for example.

Figure 5:
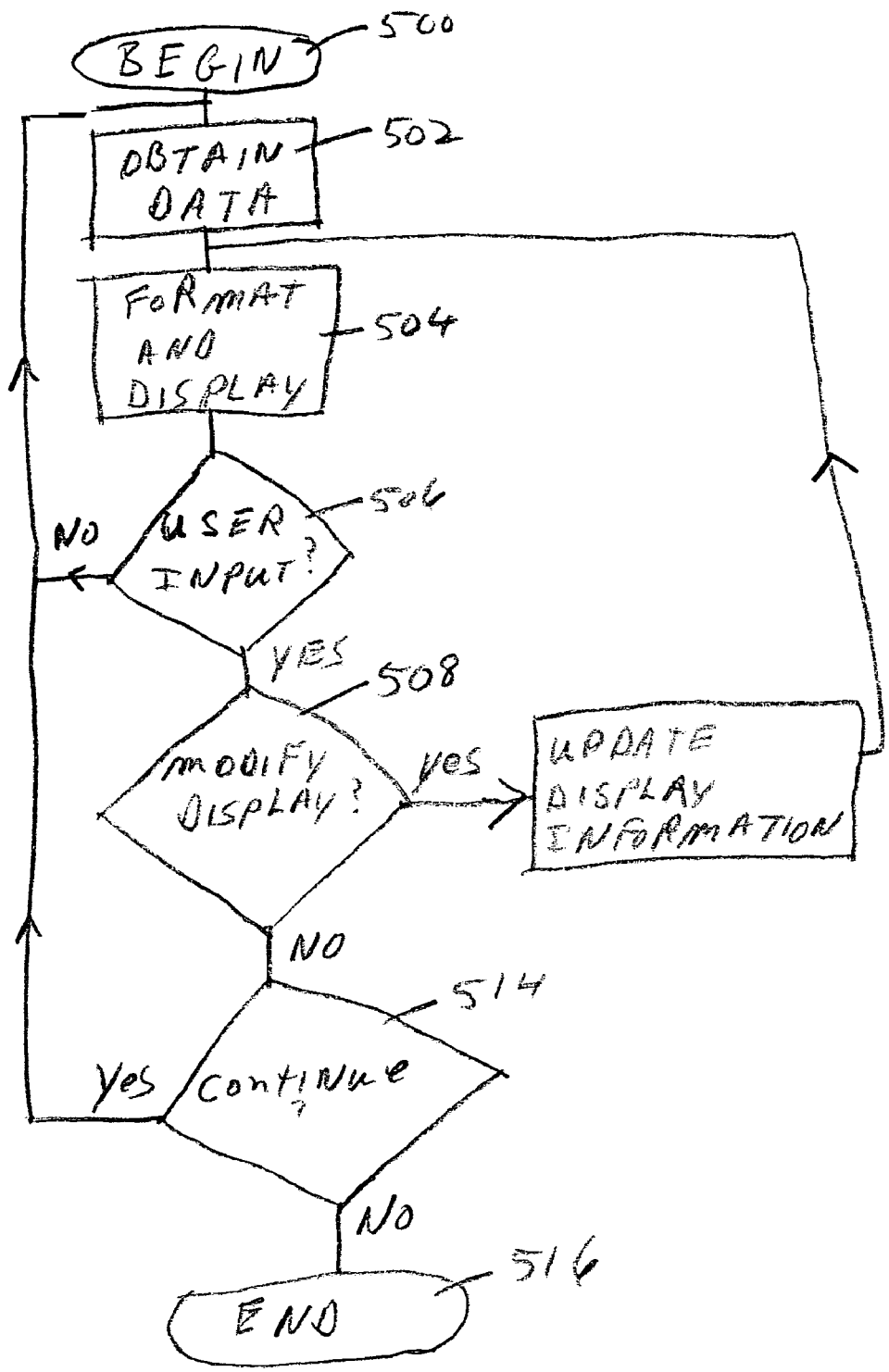
FIG. 5 is a flowchart that depicts the process of displaying work center monitoring information in accordance with the principles of the present invention.

The flowchart of FIG. 5 provides an overview of the process by which supervisory information is displayed in accordance with the principles of the present invention. The process begins in step 500 and proceeds from there to step 502 where contact and fulfillment center data is obtained for display. This information may be obtained in a variety of ways. For example, the manager 100 described in conjunction with the description of FIG. 1 may query center components, information may automatically be transmitted to the manager 100 at periodic intervals, or the transmission of center information may be event driven. However the information may be obtained, once obtained, the information is formatted and displayed graphically in step 504 by the controller 110.

Figure 4:
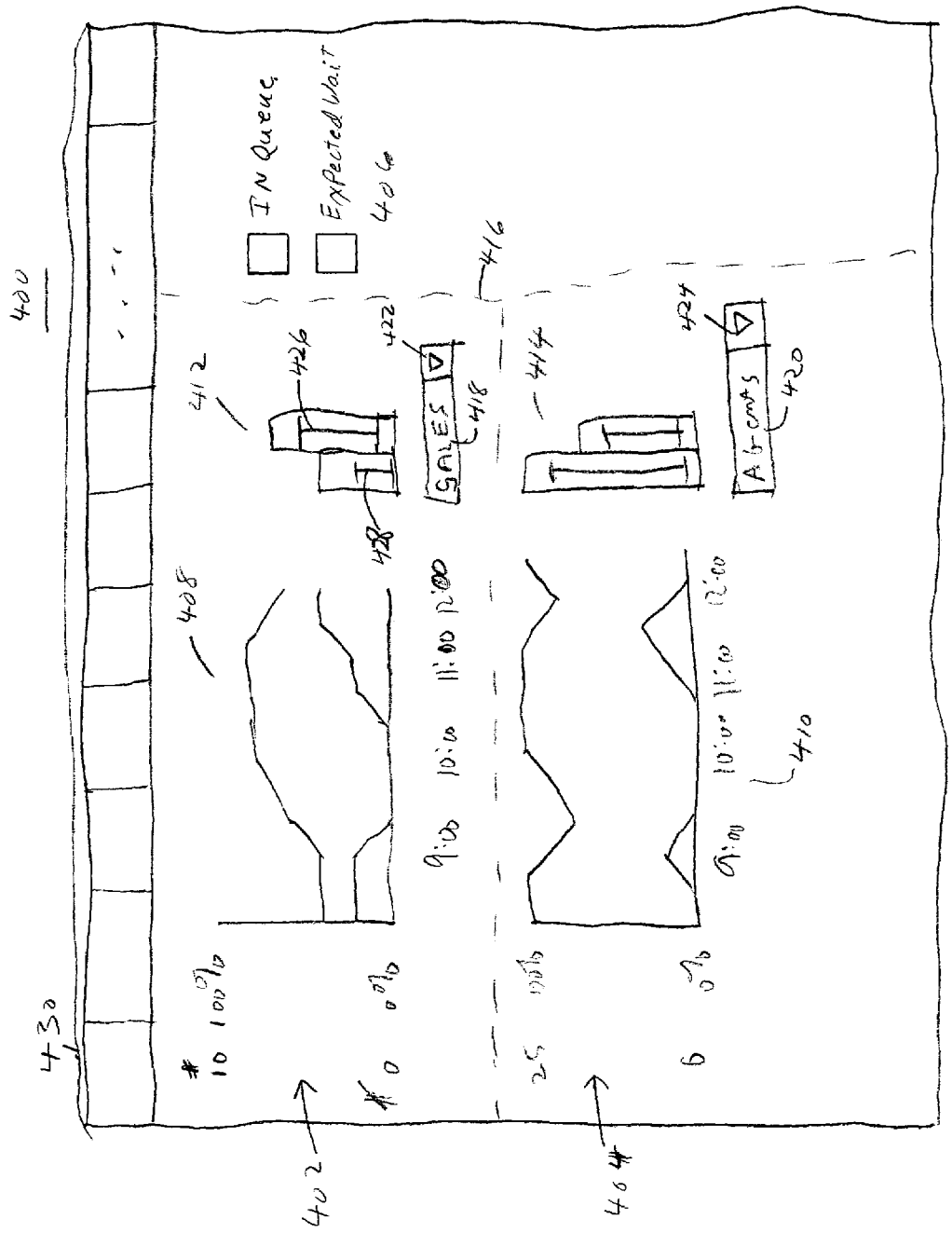
FIG. 4 is a conceptual diagram illustrating the display of work center information in accordance with the principles of the present invention.

The graphical display may take the form, for example, of a plurality of monitors, each of which includes, line and bar charts, an interpretive key, and labels and affordances, as described in the discussion related to FIG. 4, for example. The display may be updated regularly and frequently (in steps not illustrated) before the process proceeds to step 506 where it is determined whether any user input has been received. This input may take the form of "clicking on", or "hovering over" a displayed "I-beam" glyph, and the indication of user input may be event-driven or polled, for example. If it is determined in step 506 that there is no user input, the process returns to step 502 and proceeds from there as previously described.

If user input is detected in step 506, the process proceeds to step 508 where it is determined whether the user input was an indication that the display is to be modified. If the display is to be modified in response to user input, to modify an acceptable range, for example, the process proceeds to step 510 where display information in the display controller 110 is updated accordingly. Additionally, the underlying system may also be modified at this point, with center resources reassigned in response to user modification of the display. From step 510 the process proceeds to step 504 and from there as previously described. If the user input does not require an update to the display, the process proceeds to step 514 where it may continue, returning to display and respond to user input as previously described. From step 514 the process may proceed to end in step 516 when a system being monitored shuts down, for example.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 2, or transmittable to a computer system, via a modem or other interface device, such as communications adapter 190 connected to the network 195 over a medium 191. Medium 191 can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A contact center, comprising:
    a plurality of queues to hold contacts waiting to be serviced;
    a plurality of agents to service the contacts, the agents being subdivided into groups having different skills and each of the queues corresponding to an agent group;
    a contact distributor to route contacts to a selected queue;
    a controller to generate and send commands to other contact center components; and
    a supervisor interface comprising a display and an input device, the display displaying simultaneously a graphical representation of historic values of a monitored parameter and a graphical representation of a current value for the monitored parameter, wherein the monitored parameter is at least one of a number of calls in queue, an expected wait time for a call to receive service, an oldest wait time in queue, and a number of available agents.

2. The contact center of claim 1, wherein a plurality of the at least one of a number of calls in queue, an expected wait time for a call to receive service, an oldest wait time in queue, and a number of available agents are displayed at one time by the display.

3. The contact center of claim 1, wherein the display further displays, concurrently with the monitored parameter, at least one of a maximum and minimum preferred value for the monitored parameter.

4. The contact center of claim 3, wherein the at least one of a maximum and minimum preferred value is displayed on the graphical representation of the current value.

5. The contact center of claim 3 wherein the at least one of the maximum and minimum preferred value is rendered as an affordance, wherein, in response to user manipulation of the affordance, the controller generates and sends a command to a contact center component to alter a contact center operation.

6. The contact center of claim 5, wherein the contact center operation is at least one of routing of contacts, issuing a warning, and assigning a level to the warning.

7. The contact center of claim 3, wherein, when the monitored parameter is one of above the maximum preferred value and below the minimum preferred value, a displayed color changes from a first normal color to a second different warning color to alert a user.

8. The contact center of claim 4, wherein the at least one of a maximum and minimum preferred value is displayed as an I-beam glyph, with the upper bar of the "I" representing the position of the maximum preferred value and the lower bar of the "I" representing the position of the minimum preferred value, and wherein the I-beam glyph is overlaid on the graphical representation of the current value.

9. The contact center of claim 8, wherein the graphical representation of the current value is a bar chart and the graphical representation of the historic values is a line chart.

10. In a contact center, the contact center comprising a plurality of queues to hold contacts waiting to be serviced; a plurality of agents to service the contacts, the agents being subdivided into groups having different skills; a contact distributor to route contacts to a selected queue; a controller to generate and send commands to other contact center components; and a supervisor interface comprising a display and an input device, a method comprising the step:

the display displaying simultaneously a graphical representation of historic values of a monitored parameter and a graphical representation of a current value for the monitored parameter, wherein the monitored parameter is at least one of a number of calls in queue, an expected wait time for a call to receive service, an oldest wait time in queue, and a number of available agents.

11. The method of claim 10, wherein the display displays, at one time, a plurality of the at least one of a number of calls in queue, an expected wait time for a call to receive service, an oldest wait time in queue, and a number of available agents.

12. The method of claim 10, wherein the display further displays, concurrently with the monitored parameter, at least one of a maximum and minimum preferred value for the monitored parameter.

13. The method of claim 12, wherein the at least one of a maximum and minimum preferred value is displayed on the graphical representation of the current value.

14. The method of claim 12 wherein the at least one of the maximum and minimum preferred value is rendered as an affordance and further comprising:

in response to user manipulation of the affordance, the controller generating and sending a command to a method component to alter a contact center operation.

15. The method of claim 14, wherein the contact center operation is at least one of routing of contacts, issuing a warning, and assigning a level to the warning.

16. The method of claim 15, wherein the operation is routing of contacts.

17. The method of claim 14, wherein, when the monitored parameter is one of above the maximum preferred value and below the minimum preferred value, a displayed color changes from a first normal color to a second different warning color to alert a user.

18. The method of claim 13, wherein the at least one of a maximum and minimum preferred value is displayed as an I-beam glyph, with the upper bar of the "I" representing the position of the maximum preferred value and the lower bar of the "I" representing the position of the minimum preferred value, and wherein the I-beam glyph is overlaid on the graphical representation of the current value.

19. The method of claim 18, wherein the graphical representation of the current value is a bar chart and the graphical representation of the historic values is a line chart.

20. A contact center, comprising:

a plurality of queues to hold contacts waiting to be serviced;

a plurality of agents to service the contacts, the agents being subdivided into groups having different skills;

a contact distributor to route contacts to a selected queue;

a controller to generate and send commands to other contact center components; and a supervisor interface comprising a display and an input device, wherein the display displays simultaneously a graphical representation of a current value for the monitored parameter and at least one of a maximum and minimum value for the monitored parameter, wherein the monitored parameter is at least one of a number of calls in queue, an expected wait time for a call to receive service, an oldest wait time in queue, and a number of available agents, wherein the at least one of the maximum and minimum value is rendered as an affordance, wherein, in response to user manipulation of the affordance, the controller generates and sends a command to a contact center component to alter a contact center operation.

21. The contact center of claim 20, wherein the display displays simultaneously a graphical representation of historic values of the monitored parameter and the graphical representation of a current value for the monitored parameter.

22. The contact center of claim 21, wherein a plurality of the at least one of a number of calls in queue, an expected wait time for a call to receive service, an oldest wait time in queue, and a number of available agents are displayed at one time by the display.

23. The contact center of claim 20, wherein the display further displays, concurrently with the monitored parameter, both the maximum and minimum value for the monitored parameter.

24. The contact center of claim 20, wherein the at least one of a maximum and minimum preferred value is displayed on the graphical representation of the current value.

25. The contact center of claim 20, wherein the contact center operation is at least one of routing of contacts, issuing a warning, and assigning a level to the warning.

26. The contact center of claim 20, wherein, when the monitored parameter is one of above the maximum preferred value and below the minimum preferred value, a displayed color changes from a first normal color to a second different warning color to alert a user.

27. The contact center of claim 20, wherein the at least one of a maximum and minimum preferred value is displayed as an I-beam glyph, with the upper bar of the "I" representing the position of the maximum preferred value and the lower bar of the "I" representing the position of the minimum preferred value, and wherein the I-beam glyph is overlaid on the graphical representation of the current value.

28. The contact center of claim 27, wherein the graphical representation of the current value is a bar chart and the graphical representation of the historic values is a line chart.

29. The contact center of claim 20, wherein the monitored parameter is at least one of a number of calls in queue, an expected wait time for a call to receive service, and an oldest wait time in queue, wherein the at least one of maximum and minimum value is the maximum value, and wherein, when the maximum value is increased by user manipulation of the affordance, a number of calls in queue is increased in response thereto and, when the maximum value is decreased by user manipulation of the affordance, the number of calls in queue is decreased in response thereto.

30. A computer readable medium comprising executable instructions to perform the steps of claim 10.

* * * * *